(12) United States Patent
Lee

(10) Patent No.: US 7,465,156 B2
(45) Date of Patent: Dec. 16, 2008

(54) APPARATUS FOR MOUNTING COMPRESSOR

(75) Inventor: Dong-Won Lee, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 11/013,393

(22) Filed: Dec. 17, 2004

(65) Prior Publication Data

US 2006/0216165 A1 Sep. 28, 2006

(51) Int. Cl.
*F04B 17/04* (2006.01)
*F04B 35/04* (2006.01)

(52) U.S. Cl. ........................ 417/417; 417/363
(58) Field of Classification Search ............. 417/363, 417/417
See application file for complete search history.

(56) References Cited

U.S. PATENT DOCUMENTS

| | | | | |
|---|---|---|---|---|
| 3,785,167 | A * | 1/1974 | Sahs | 62/296 |
| 4,891,955 | A * | 1/1990 | Klausing et al. | 62/295 |
| 5,145,330 | A * | 9/1992 | Uchiyama | 417/363 |
| 5,221,192 | A * | 6/1993 | Heflin et al. | 417/363 |
| 5,306,121 | A * | 4/1994 | Heflin et al. | 417/363 |
| 5,913,892 | A * | 6/1999 | Kwon | 62/296 |
| 6,088,896 | A * | 7/2000 | Tang et al. | 29/235 |
| 6,435,842 | B2 * | 8/2002 | Song | 417/363 |
| 6,648,295 | B2 * | 11/2003 | Herren et al. | 248/636 |
| 6,912,865 | B2 * | 7/2005 | Seo et al. | 62/295 |
| 6,912,866 | B2 * | 7/2005 | Seo et al. | 62/295 |
| 2004/0096341 | A1 * | 5/2004 | Hung | 417/363 |

FOREIGN PATENT DOCUMENTS

| | | |
|---|---|---|
| CN | 1266955 A | 9/2000 |
| CN | 1341812 A | 3/2002 |
| CN | 1458411 A | 11/2003 |
| JP | 55157197 | 11/1980 |
| JP | 57131644 | 8/1982 |
| JP | 58165270 | 11/1983 |
| JP | 64015778 | 1/1989 |
| JP | 2002-221158 | 8/2002 |
| JP | 2002-323239 | 11/2002 |

* cited by examiner

*Primary Examiner*—Devon Kramer
*Assistant Examiner*—Patrick Hamo
(74) *Attorney, Agent, or Firm*—Birch, Stewart, Kolasch & Birch, LLP

(57) ABSTRACT

An apparatus for mounting a compressor comprises: a bracket installed at one surface of a compressor and having a plurality of holes; a plurality of supporting members extending from a base on which the compressor is mounted and protrudingly formed to pass the holes of the bracket; and a plurality of elastic members, each elastic member surrounding one end of each supporting member and inserted in the hole at a certain interval between its inner circumferential surface and the supporting member, for elastically supporting the bracket, thereby effectively reducing vibration of the compressor and improving reliability of a product provided with the compressor.

9 Claims, 4 Drawing Sheets

APPARATUS FOR MOUNTING COMPRESSOR

BACKGROUND OF THE INVENTION

1. Field of the Invention

The present invention relates to an apparatus for mounting a compressor, and particularly, to an apparatus for mounting a compressor configured to reduce transmission of vibration generated during operation of a compressor to a product provided with the compressor.

2. Description of the Background Art

In general, a compressor constituting a refrigerating cycle system is a device that compresses a low temperature low pressure refrigerant introduced from an evaporator and discharges a high temperature high pressure refrigerant. The compressor is classified into a rotary compressor, a reciprocating compressor, a scroll compressor and the like according to methods of compressing a fluid. Such a compressor commonly includes a hermetic container, a motor unit mounted in the hermetic container and generating a driving force, and a compression unit compressing a gas upon receiving a driving force of the motor unit.

Particularly, in the reciprocating compressor, a compressor body sucks, compresses and discharges a fluid, wherein the compressor body is formed as an assembly in which a reciprocating motor generating a linearly reciprocating driving force, a compression unit compressing a fluid upon receiving the driving force of the reciprocating motor and the like are assembled.

FIGS. 1 and 2 show a conventional reciprocating compressor. As shown, the reciprocating compressor includes: a casing 10; a compressor main body 20 positioned in the casing 10 and formed as an assembly in which a reciprocating motor generating a linearly reciprocating driving force, a compression unit compressing a fluid upon receiving the driving force of the reciprocating motor and the like are assembled; and a plurality of coil springs 30 for allowing the compressor main body 20 to be elastically supported by the casing 10 to thereby reduce vibration generated during operation of the reciprocating compressor.

The coil spring 30 is fixed to a plurality of fixing portions 40 which are formed at the compressor main body 20 and the inside of the casing 11 in a facing manner, respectively, and is compressed and extended according to vibration of the compressor 10.

A structure of an apparatus 60 for mounting a compressor for mounting the compressor 10 in a product such as an air conditioner, a refrigerator or the like is as follows.

A bracket 51 having coupling holes 51a at its four corners is formed at a lower surface of the compressor 10, and an elastic member 52 such as rubber is inserted in each coupling hole 51a to thereby elastically support the bracket 51.

Also, the elastic member 52 has a through hole 52a at its central portion to be inserted in and fixed to a fixing pin 53 protruding at a certain height from a base (b) on which the compressor 10 is mounted. A stopping portion 52b is formed at an upper portion of the elastic member 52 to be inserted in and fixed to the coupling hole 51a, and a vibration reducing layer 52c for reducing transmission of vibration of the compressor to the base (b) of the compressor is formed at a middle portion of the elastic member 52.

Also, a stopper 54 is inserted in a stopping projection 53a formed at an end portion of the fixing pin 53 and thereby supports the stopping portion 52b of the elastic member 52 so as to prevent separation of the elastic member 52 from the fixing pin 53.

Undescribed reference mark 13 is a suction pipe for guiding a refrigerant to be introduced into the compression main body 20, and 14 is a discharge pipe through which a refrigerant compressed by the compressor main body 20 is discharged.

The conventional reciprocating compressor having such a structure is operated in the following manner.

A reciprocating motor constituting the compressor main body 20 generates a linearly reciprocating driving force, and the compression unit sucks, compresses and discharges a fluid upon receiving the driving force.

While such processes are repetitively carried out, vibration is generated by operation of the reciprocating motor and the compression unit constituting the compressor main body 20. The vibration is reduced by the coil spring whose both ends are supported by the fixing portions 40, thereby reducing the vibration transmitted to the casing 10.

The elastic member 52 inserted upon the fixing pin 53 and in the coupling hole 51a of the bracket 51 prevents transmission of the vibration to the base (b) on which the compressor is mounted.

However, in the apparatus for mounting a compressor, a range within which the elastic member is compressed and extended according to the vibration of the compressor is undesirably limited because the fixing pin is inserted in the center of the elastic member and one end of the elastic member is insertedly fixed to the coupling hole of the bracket. For this reason, although the elastic member is used to absorb the vibration of the compressor, part of the vibration of the compressor is not absorbed by the elastic member but is transmitted to the base through the fixing pin.

Also, in case of the reciprocating compressor, vibration is generated not only in a direction perpendicular to the base but also in a direction parallel to the base. However, because there is a structural limit in movement and transformation of the elastic member as described above, the vibration in the parallel direction is not absorbed well.

In addition, the vibration of the compressor in the direction perpendicular to the base is undesirably transmitted to the base through the elastic member which is in contact with the base.

SUMMARY OF THE INVENTION

Therefore, an object of the present invention is to provide an apparatus for mounting a compressor configured to reduce transmission of vibration generated during operation of a compressor to a product in which the compressor is mounted.

To achieve these and other advantages and in accordance with the purpose of the present invention, as embodied and broadly described herein, there is provided an apparatus for mounting a compressor comprising: a bracket installed at one surface of a compressor and having a plurality of holes; a plurality of supporting members extending from a base on which the compressor is mounted and protrudingly formed to pass the holes of the bracket; and a plurality of elastic members, each elastic member surrounding one end of each supporting member and inserted in the hole at a certain interval between its inner circumferential surface and the supporting member, for elastically supporting the bracket.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Figure 1:
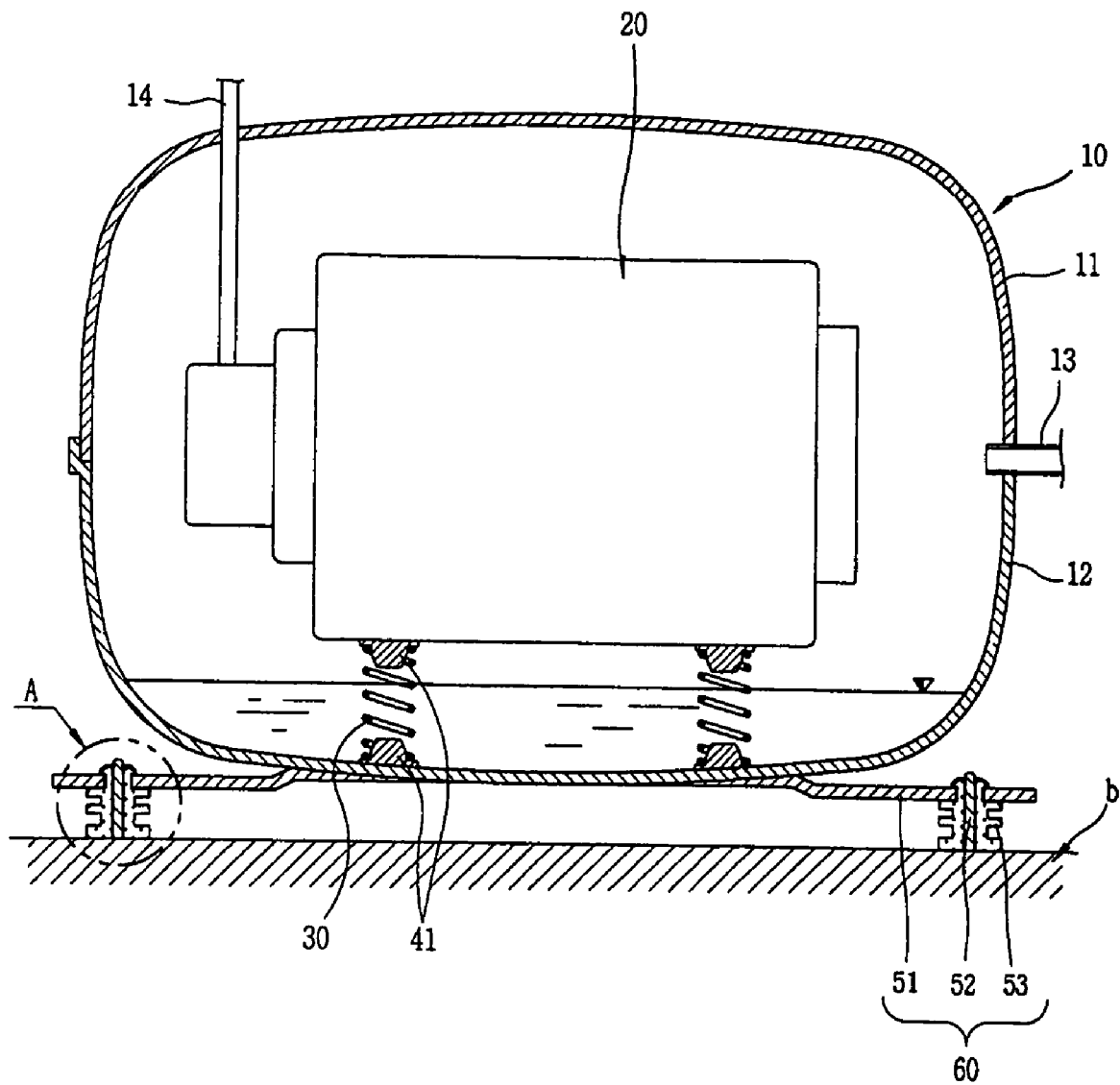
FIG. 1 is a sectional view of a compressor employing a conventional apparatus for mounting a compressor is applied.
Figure 2:
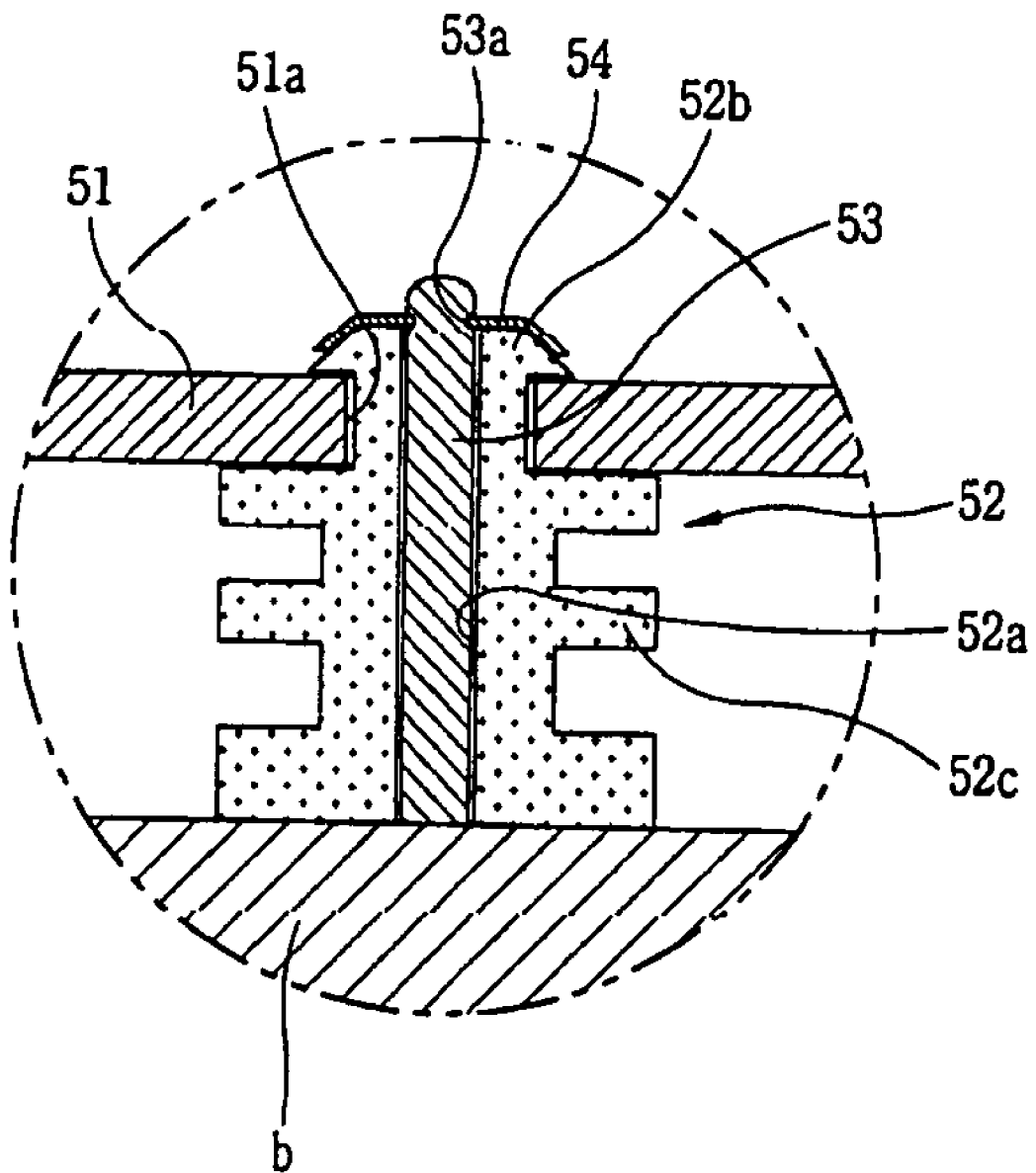
FIG. 2 is an enlarged view showing the conventional apparatus for mounting a compressor.

Reference will now be made in detail to the preferred embodiments of the present invention, examples of which are illustrated in the accompanying drawings. Like reference numerals designate like or corresponding parts to the conventional art.

There may exist a plurality of embodiments for an apparatus for mounting a compressor in accordance with the present invention, and hereinafter, the most preferred embodiment will be described.

Figure 3:
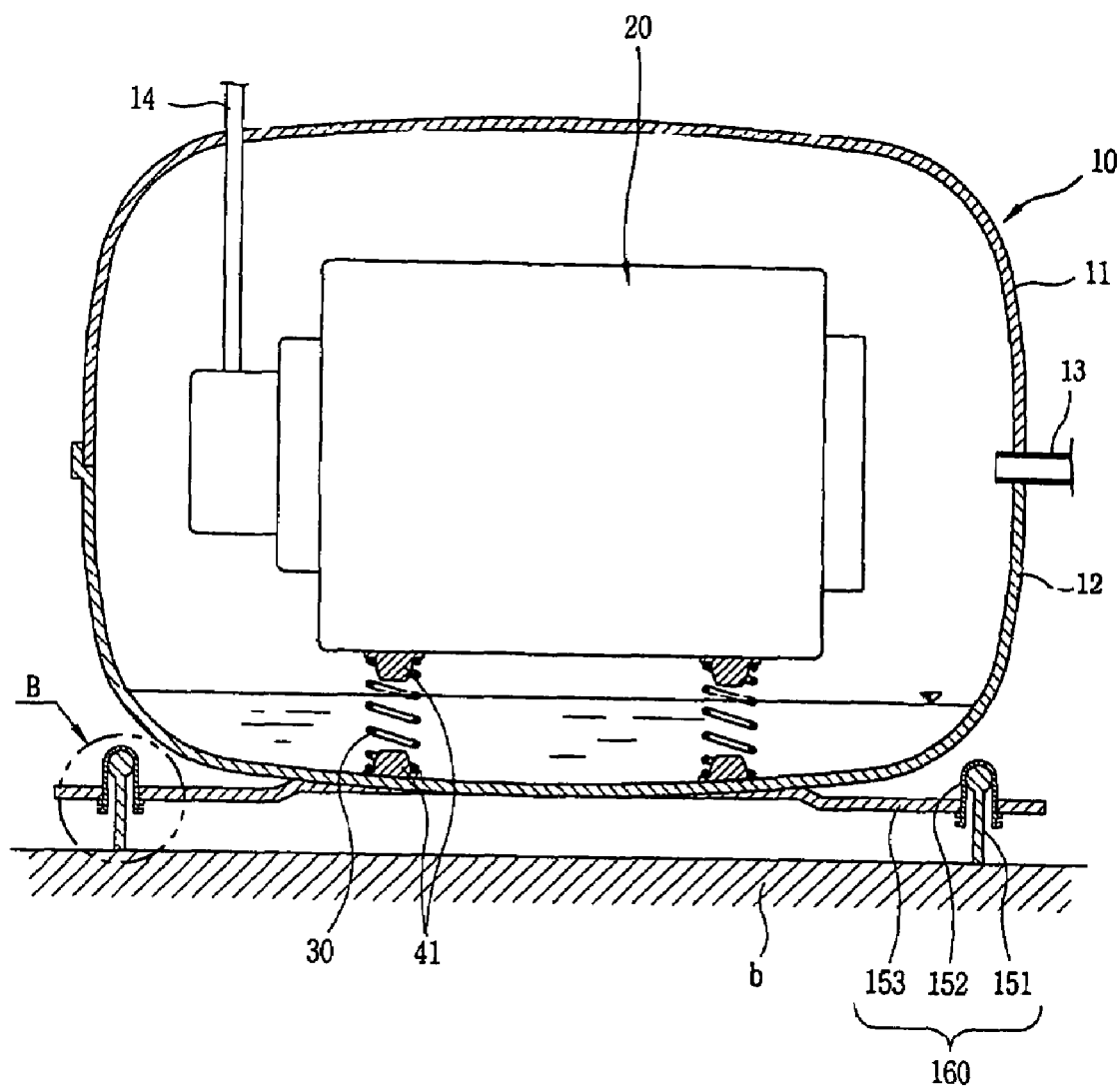
FIG. 3 is a sectional view of a compressor employing an apparatus for mounting a compressor in accordance with one embodiment of the present invention.

FIG. 3 is a sectional view of a compressor employing an apparatus for mounting a compressor in accordance with one embodiment of the present invention.

Figure 4:
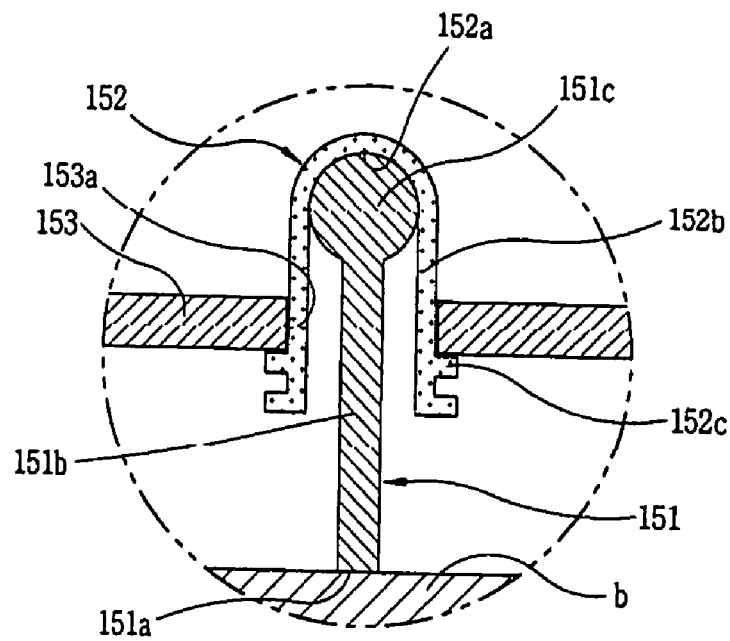
FIG. 4 is an enlarged view showing the apparatus for mounting a compressor in accordance with one embodiment of the present invention.

FIG. 4 is an enlarged view showing the apparatus for mounting a compressor in accordance with one embodiment of the present invention.

As shown, the apparatus for mounting a compressor in accordance with one embodiment of the present invention includes: a bracket 153 installed at one surface of the compressor 10 and having a plurality of holes 153a; a plurality of supporting members 151 extending from a base (b) on which the compressor is mounted, and protrudingly formed to pass the holes 153a of the bracket 153; and a plurality of elastic members 152, each elastic member encompassing one end of each supporting member 151 and inserted in the hole 153a at a certain interval between its inner circumferential surface and the supporting member 151, for elastically supporting the bracket 153.

Preferably, the holes 153a are respectively formed at four corners of the bracket 153, the elastic member 152 is inserted in each hole 153a, and the supporting member 151 is formed on the base (b), corresponding to a position where each hole 153a is mounted. In addition, according to designs, the mounting structure may be formed at various positions.

Each supporting member 151 includes: a first end 151a fixed to the base (b); a body 151b extending from the first end 151a perpendicularly to the base (b) and passing the hole 153a; and a second end 151c extending from the body 151b with enlarged diameter and area, for supporting the elastic member 152.

The second end 151c of the supporting member 151 is formed as a spherical shape and is surrounded by the elastic member 152.

Each elastic member 152 includes: a first portion 152a whose inner surface surface-contacts with the second end 151c of the supporting member 151; a second portion 152b extending from the first portion 152a and passing the hole 153a, leaving a certain gap between its inner circumferential surface and the supporting member 151; and a third portion 152c protruding from an outer circumferential surface of opened one end of the second portion 152b, for supporting an edge of the hole 153a of the bracket 153.

Namely, the elastic member 152 is formed as a cup shape having a certain interior space and is installed to cover the second end 151c of the supporting member 151. And the bracket 153 formed at one surface of the compressor is supported by the third portion 152c protrudingly formed at the outer circumferential surface of one end of the second portion of the elastic member 152 inserted through the hole 153a. Accordingly, a load of the compressor is effectively dispersed by the elastic member and the supporting member.

Also, the second end 151c of the supporting member 151 surrounded by the elastic member 152 extends from the body 151b of the supporting member 151 with expanded diameter and area, whereby the elastic member 152 inserted in the hole 153a of the bracket 153 and supported by the supporting member 151 is prevented from being separated.

Also, a certain interval is formed between an inner circumferential surface of the second portion 152b of the elastic member 152 and the body 151b of the supporting member 151, and the third portion 152c formed at opened one end of the elastic member 152 is distanced from the base (b) at a certain distance, so that the elastic member 152 can be more freely moved and transformed according to the vibration of the compressor.

In order to support a load of the compressor 10 and also effectively absorb vibration generated in a direction perpendicular to the base, of the vibration of the compressor, it is preferable that a plurality of third portions 152c of the elastic member 152 are protrudingly formed at regular intervals therebetween along a longitudinal direction of the second portion 152b of the elastic member 152. FIG. 4 shows two protrudingly-formed third portions of the elastic member.

Preferably, the elastic member is made of a rubber material, but it may be made of another elastic material.

Figure 5:
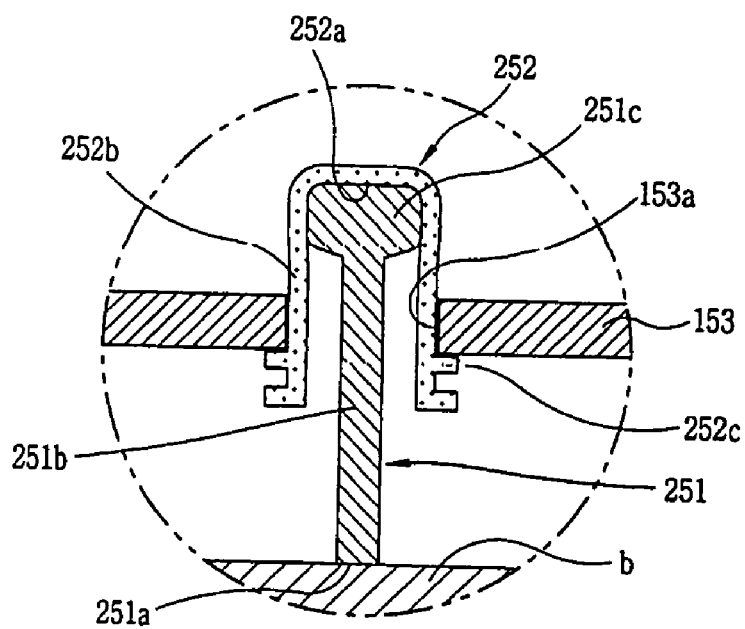
FIG. 5 is an enlarged view showing an apparatus for mounting a compressor in accordance with another embodiment of the present invention.

FIG. 5 shows an apparatus for mounting a compressor in accordance with another embodiment of the present invention.

As shown, the apparatus for mounting a compressor in accordance with another embodiment of the present invention includes: a bracket 153 installed at one surface of the compressor 10 and having a plurality of holes 153a; a plurality of supporting members 251 extending from a base (b) on which the compressor 10 is mounted and protrudingly formed to pass the holes 153a of the bracket 153; and a plurality of elastic members 252, each elastic member surrounding one end of each supporting member 251 and inserted in the hole 253a at a certain interval between its inner circumferential surface and the supporting member 251, for elastically supporting the bracket 153.

Each supporting member 251 includes: a first end 251a fixed to the base (b); a body 251b extending from the first end 251a perpendicularly to the base (b) and passing the hole 253a; and a second end 251c extending from the body 251b with expanded diameter and area, for supporting the elastic member 252.

Each elastic member 252 includes: a first portion 252a whose inner surface surface-contacts with the second end 251c of the supporting member 251; a second portion 252b extending from the first portion 252a and passing the hole 253a, leaving a certain gap between its inner circumferential surface and the supporting member 251; and a third portion 252c protruding from an outer circumferential surface of opened one end of the second portion 252b, for supporting an edge of the hole 153a of the bracket 153.

Here, the second end 251c of the supporting member 251 is formed as a substantially quadrangular shape and is surrounded by the elastic member 252. Namely, an area where the second end 251c of the supporting member 251 contacts with the first portion 252a of the elastic member 252 in a direction parallel to the base (b) is increased, so that dispersion effect of a load of the compressor 10 in a direction perpendicular to the base (b) is improved. Therefore, absorption of the vibration generated from the compressor 10 may be improved.

Other structural characteristics of the apparatus for mounting a compressor in accordance with another embodiment of the present invention are the same as those of above-described one embodiment of the present invention. Therefore, detailed descriptions thereon will be omitted.

Meanwhile, the apparatus 60 and 160 for mounting a compressor may be used for all kinds of compressors. Particularly, the apparatus for mounting a compressor in accordance with the present invention is preferably applied to a reciprocating compressor. Herein, the reciprocating compressor includes: a casing 10; a compressor main body 20 positioned in the casing 10 and including a compression unit having a reciprocating motor for generating a linearly reciprocating driving force and a piston for compressing a fluid while linearly moving upon receiving the driving force of the reciprocating motor and a resonant spring for elastically supporting the piston so as to induce a resonant movement of the piston; and a plurality of coil springs 30 for allowing the compressor main body 20 to be elastically supported by the casing 10 to thereby reduce vibration generated during operation of the reciprocating compressor.

The apparatus for mounting a compressor in accordance with the present invention is operated in the following manner.

The compressor 10 is vibrated while discharging a gas through the discharge pipe 14 after sucking the gas through the suction pipe 13 and compressing the gas. The vibration of the compressor 10 is absorbed through a plurality of elastic members 152 and 252 which are inserted in the holes 153a formed at the bracket 153 of the compressor 10 to thereby support the bracket 153 and which are supported by a plurality of supporting members 151 and 251 protruding from the base (b). At this time, the elastic member 152 and 252 is installed at a certain interval between itself and the body 151b and 251b of the supporting member 151 and 251, and is also installed at a certain interval from the base (b), whereby the elastic member can move freely. Accordingly, the elastic member 152 and 252 can move freely without any restriction of the vibration of the compressor 10, especially, the vibration generated in directional parallel and perpendicular to the base (b). Thus, the elastic member 152 and 252 can more effectively absorb the vibration of the compressor 10.

In addition, because the elastic member 152 and 252 is not in contact with the base (b), the vibration of the compressor 10, which is generated in a direction perpendicular to the base (b), is not transmitted to the base (b) and is more effectively absorbed by the elastic member 152 and 252.

As so far described, in the apparatus for mounting a compressor in accordance with the present invention, the elastic member for absorbing the vibration of the compressor is installed so as to make a movement and elastic transformation freely. Accordingly, the apparatus for mounting compressor in accordance with the present invention can effectively reduce vibration of the compressor, which is generated not only in direction perpendicular and parallel to the base on which the compressor is mounted but also in other directions.

As the vibration generated from the compressor is reduced in such a manner, reliability and quietness of operation of a product such as an air conditioner and a refrigerator provided with the compressor can be remarkably improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for mounting a compressor, the apparatus comprising:
    a bracket installed at one surface of a compressor and having a plurality of holes;
    a plurality of supporting members extending from a base on which the compressor is mounted and protrudingly formed to pass the holes of the bracket, said base being below the bracket installed at the one surface of the compressor; and
    a plurality of elastic members, each elastic member surrounding one end of each supporting members and inserted in the holes, for elastically supporting the bracket,
    wherein an upper portion of the elastic members contacts an upper portion of the supporting members and a lower portion of the elastic members hangs freely below the upper portion of the supporting members such that a gap exists between an inner circumferential surface of the lower portion of the elastic members and a body portion of the supporting members.

2. The apparatus of claim 1, wherein the supporting members comprise:
    a first end fixed to the base;
    a body extending perpendicularly from the first end and passing the holes; and
    a second end extending from the body with an expanded diameter and area, for supporting the elastic member.

3. The apparatus of claim 2, wherein the elastic member comprises:
    a first portion whose inner surface contacts with the second end of the supporting members;
    a second portion extending from the first portion and passing the holes; and
    a third portion protruding from an outer circumferential surface of an opened one end of the second portion, for supporting an edge of the holes of the bracket.

4. The apparatus of claim 2, wherein the second end of the supporting members is formed as a spherical shape.

5. The apparatus of claim 2, wherein the second end of the supporting members is formed as a substantially quadrangular shape.

6. The apparatus of claim 3, wherein a plurality of third portions of the elastic member are protrudingly formed at regular intervals therebetween along a longitudinal direction of the second portion.

7. The apparatus of claim 6, wherein two third portions of the elastic member are protrudingly formed at a certain interval therebetween along a longitudinal direction of the second portion.

8. The apparatus of claim 1, wherein the elastic member is made of a rubber material.

9. The apparatus of claim 1, wherein the compressor is a reciprocating compressor comprising:

a casing; and a compressor main body positioned in the casing and including a compression unit having a reciprocating motor for generating a linearly reciprocating driving force and a piston for compressing a fluid while linearly moving upon receiving the driving force of the reciprocating motor and a resonant spring for elastically supporting the piston to thereby lead a resonant movement of the piston.

* * * * *